United States Patent [19]

Allen et al.

[11] Patent Number: 4,804,477

[45] Date of Patent: Feb. 14, 1989

[54] APPARATUS AND METHOD FOR PROCESSING OIL WELL BRINE

[75] Inventors: Thomas F. Allen; David G. Austin, both of Columbus, Ohio

[73] Assignee: Thomas F. Allen et al., Columbus, Ohio

[21] Appl. No.: 838,179

[22] Filed: Mar. 10, 1986

[51] Int. Cl.$^4$ .............................. B01D 1/14
[52] U.S. Cl. ........................... 210/737; 210/180; 159/26.1; 159/46; 202/181; 202/187
[58] Field of Search ............ 159/45, 47.3, 26.1, 159/46; 210/709, 737, 180, 175; 202/181, 187

[56] References Cited

U.S. PATENT DOCUMENTS

| 903,357 | 11/1908 | Clifton . | |
|---|---|---|---|
| 1,671,446 | 5/1928 | Paulus . | |
| 1,721,760 | 7/1929 | Zeitlea . | |
| 1,997,980 | 4/1935 | Smith | 159/47.3 |
| 2,392,893 | 1/1946 | Williamson | 159/46 |
| 2,398,396 | 4/1946 | Powell | 159/46 |
| 2,643,974 | 6/1953 | Impagliazzo | 202/177 |
| 3,004,107 | 4/1963 | McMahon | 159/47.3 |
| 3,248,305 | 4/1966 | Williamson | 159/26.1 |
| 3,390,078 | 6/1968 | Hatch | 210/737 |
| 4,276,115 | 6/1981 | Greenfield | 159/47.3 |
| 4,395,338 | 7/1983 | Rowton | 210/747 |
| 4,411,074 | 10/1983 | Daly | 34/32 |
| 4,497,690 | 2/1985 | Manzone | 202/181 |
| 4,514,260 | 4/1985 | Din Nassea | 159/DIG. 8 |
| 4,525,243 | 6/1985 | Miller | 202/181 |
| 4,600,474 | 7/1986 | Koaenowski | 159/47.3 |

Primary Examiner—Benoit Castel
Assistant Examiner—Richard D. Jordan
Attorney, Agent, or Firm—Thomas S. Baker, Jr.

[57] ABSTRACT

An apparatus and process for the controlled concentration of oil well brine which is adapted to be situated at a well site where oil well brine is produced and which evaporates water from the brine to cause precipitable salt to precipitate out of solution and to be recovered and to cause the remaining liquid to become concentrated with brine constituents which also are recovered.

15 Claims, 2 Drawing Sheets

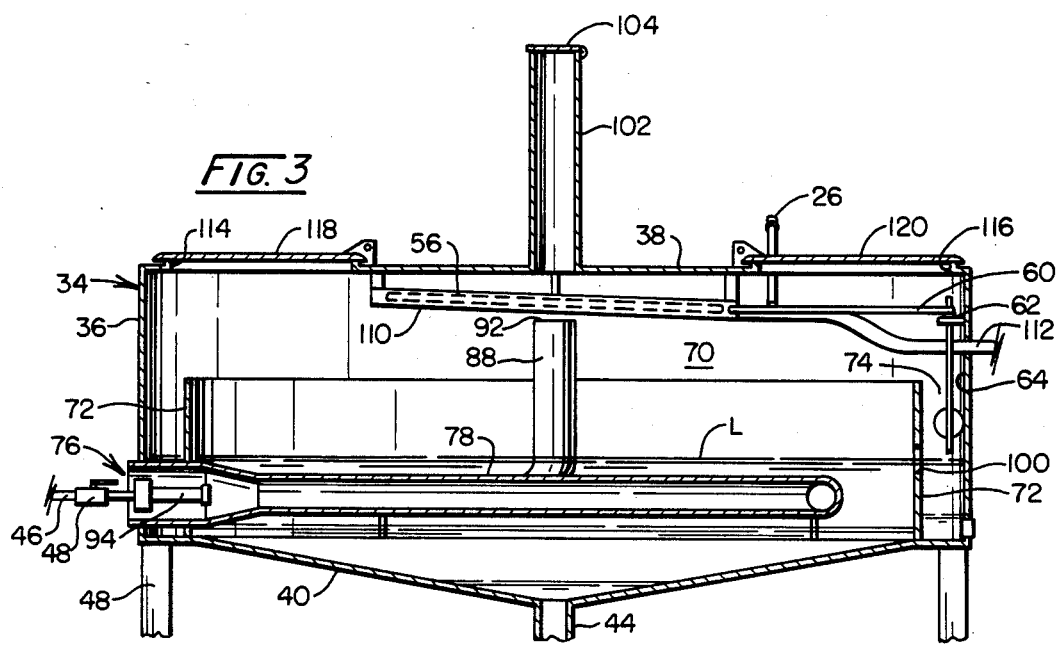
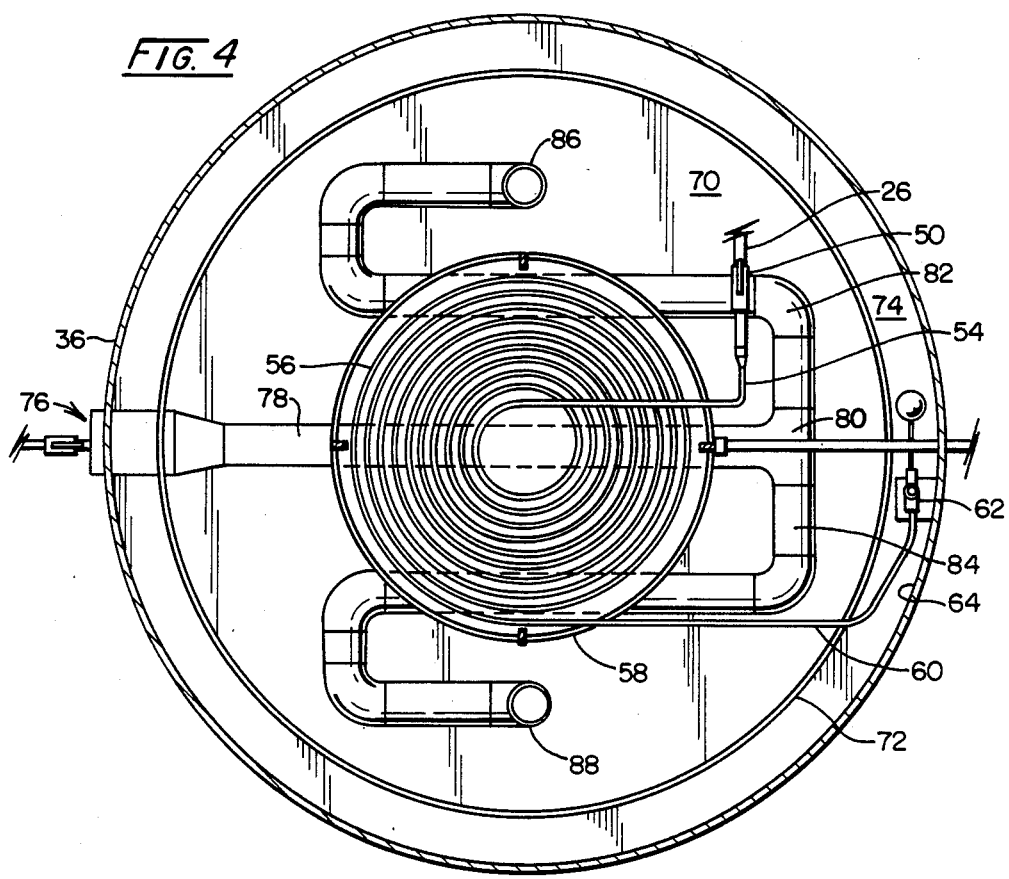

APPARATUS AND METHOD FOR PROCESSING OIL WELL BRINE

BACKGROUND OF THE INVENTION

In the production of oil and gas from wells, brine (salt water) frequently is a by-product which occurs in substantial quantities and which presents a significant disposal problem. In some wells, the amount of brine that is produced exceeds the amount of oil that is produced. Traditionally, disposal of brine has been accomplished by placing the brine in open clay or shale pits allowing the water to evaporate. However, it has been determined that leakage from such pits caused by poor construction or by over-filling presents a serious risk of contaminating local ground water supplies. Consequently, many oil and gas producing states have enacted legislation which prohibits utilizing open pits for brine storage and disposal.

As one alternative to disposing of the brine by open pit evaporation, oil and gas producers have turned to utilizing injection wells, wherein brine is injected under high pressure into suitable formations. However, this method of brine disposal has a number of disadvantages. One disadvantage is that the brine must be transported from the site where it is produced to the site of the injection well. Transportation of brine may be difficult because some well sites are located in rugged terrain where improved roadways are unavailable. Examples of such well sites may be found in sites located in the Clinton Sand Formation of the Appalachian Basin. During periods of inclement weather, many of these well sites may be inaccessible to brine transportation vehicles. A further problem associated with transporting brine is that well sites may be scattered over a wide geographic area.

Utilizing injection wells for disposal of oil well brine is expensive. Currently, the cost to an oil producer for the transportation and deep well injection of brine is between $1.40 and $2.00 per barrel. Additionally, injection wells are considered to be hazardous waste sites which require governmental approval and permits. Obtaining these permits can be a time consuming and expensive process. Injection wells also are enormously expensive to drill and complete, currently costing approximately $400,000.00 to $500,000.00. Furthermore, there is no way to determine if a target formation will accept brine until after a well has been completed. In addition to the costs involved in drilling injection wells and utilizing them for disposal of brine, there is concern that in some areas of the country, the injected brines may not remain in the target formation but may, over a period of time, migrate vertically into other formations and eventually reach fresh water reservoirs. A further disadvantage to utilizing injection wells for the disposal of brine is that none of the useful salts or the valuable trace elements and heavy metals in the brine are recovered. Salts such as sodium and calcium chloride are useful for melting ice and snow on roads. Other constituents such as potassium, magnesium, bromine, iodine, strontium, lithium, iron, aluminum, zinc, molybdenum, niobium, etc. have significant commercial value.

Many states have enacted legislation which mandates an environmentally safe method of brine disposal and storage and which imposes substantial fines for spillage of brine. At the present time there are not enough injection wells or brine haulers to handle the demand for injection well disposal. Therefore, oil producers who depend upon this method of disposal may be forced to stop pumping (shut-in) the well when adequate transportation or storage facilities for brine are not available. For some wells the cost of brine disposal is insignificant compared to the amount of revenue lost by having the well shut-in.

Another currently used alternative to disposing of brine by open pit evaporation is annular disposal. In annular disposal, brine is returned to a formation that will accept it by having it flow downwardly between the production tubing and the casing pipe of the well that produced it. To ensure that the brine flows into the receiving formation, a plug is set between the casing and the production tubing and the casing pipe is perforated at the depth of the receiving formation. Of course, this method of disposal is limited to those wells that pass through formations that are suitable for accepting brine and that can accept all the brine that is produced from the well.

Relatively small quantities of brine have been used to spray roads to control ice and snow in the winter and to control dust in the summer. However, because of the adverse impact brine may have on the environment around the roads, legislation has been enacted in many areas which prohibits such spraying. This method of disposal also requires transportation of the brine which is expensive and which may be unreliable.

It is desirable to provide means for disposing of oil well brine which does not affect the environment adversely, which does not require utilization of an apparatus that requires a large capital investment such as an injection well, which does not require transportation of the brine, which is relatively inexpensive and maintenance free, and which allows recovery of the valuable constituents contained in the brine.

SUMMARY OF THE INVENTION

The present invention is addressed to an apparatus and process for the controlled concentration of oil well brine which is adapted to be situated at a well site where brine is produced. The apparatus provides a heating means for evaporating water from the brine to cause precipitable salts to precipitate out of solution and to be recovered, and to cause the remaining liquid to become concentrated with soluble trace elements or minerals which also are recovered. With the brine processing apparatus of this invention, brine does not have to be transported from the well site for processing, thus eliminating the possibility that a well may have to be shutin due to the brine storage facility being full or due to no brine transportation being available. Additionally, no large capital investment is required for a brine disposal facility, the salts and minerals in the brine are recovered and sold, and the environment is not affected adversely. A further advantage of the brine processing apparatus is that it provides a relatively inexpensive means for disposing of brine.

It is an additional feature of the invention to provide a brine processing apparatus having a housing, an inlet in the housing for liquid brine, a main chamber in the housing for receiving brine from the inlet, heating means in the main chamber for evaporating water from the brine, and level setting means for maintaining the liquid brine at a set level in the main chamber. The level is set to have a portion of the heating means covered by the brine and to provide an air space in the housing above the main chamber. A preheating means is positioned in the main chamber above the level of the brine and is connected to the inlet for preheating incoming liquid brine before it enters the main chamber. A housing exhaust means is located above the main chamber for exhausting water vapor and gases from the housing. An outlet port for brine and precipitates is connected to the housing.

An additional feature of the invention is an integrated process for the of controlled concentration of oil well brine to cause precipitable salts to precipitate out of solution. This method includes providing a housing, a brine inlet in the housing, a main chamber in the housing for receiving brine, and a heating means in the main chamber. Also provided is a level setting means for maintaining the brine at a set level in the main chamber and for providing an air space in the main chamber above the brine, a preheating means in the air space in the main chamber, a housing exhaust above the main chamber, and an outlet in the housing for brine and precipitates. The method further provides preheating the brine in the preheating means, directing the liquid brine from the preheating means into the main chamber, heating the brine in the main chamber to obtain a slurry of precipitated salts and concentrated brine, removing the slurry from the main chamber through the outlet port, and containerizing the precipitated salt.

The invention, accordingly, comprises the apparatus, method, and system processing the construction, combinations of elements and steps, and arrangements of parts, which are exemplified in the following detailed description. For a fuller understanding of the nature and features of the invention, reference should be had to the following detailed description taken in conjunction with the accompanying drawings.

BRIEF DESCRIPTION OF THE DRAWINGS

FIG. 3 is a sectional view along line 3—3 of FIG. 2; and

FIG. 4 is a plan view along line 4—4 of FIG. 2.

DETAILED DESCRIPTION OF THE INVENTION

The present invention provides a transportable brine processing apparatus and process which is adapated to be utilized at a well site where oil mixed with significant quantities of oil well brine is produced. The process causes the controlled concentration of brine for economic and environmentally safe disposal with concomitant recovery of valuable constituents contained in the brine.

Figure 1:
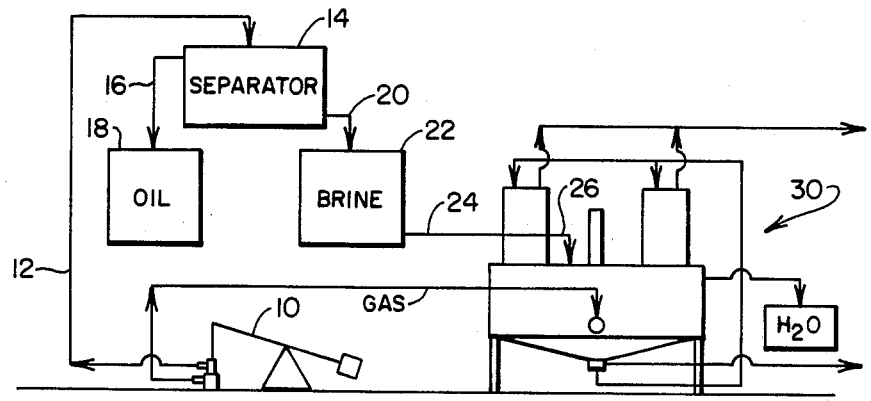
FIG. 1 is a schematic view illustrating the connection of a brine separation and storage facility to an oil well and the connection of the brine disposal apparatus of the present invention to the brine storage facility.

A schematic view of the operating environment of the brine processing apparatus of the invention may be seen by referring to FIG. 1. A mixture of oil and brine is pumped from a well 10 through a line 12 to a storage tank 14. After the oil and brine have separated and the brine has settled to the bottom of the tank 14, the oil is pumped through a line 16 to an oil storage tank 18 and the brine is transferred through a line 20 to a brine storage tank 22. Brine is transferred from tank 22 through a line 24 to the inlet pipe 26 of the brine processing apparatus 30 of the present invention. In a typical installation, apparatus 30 is located below tank 22 and gravity causes brine to flow into the inlet pipe 26.

Figure 2:
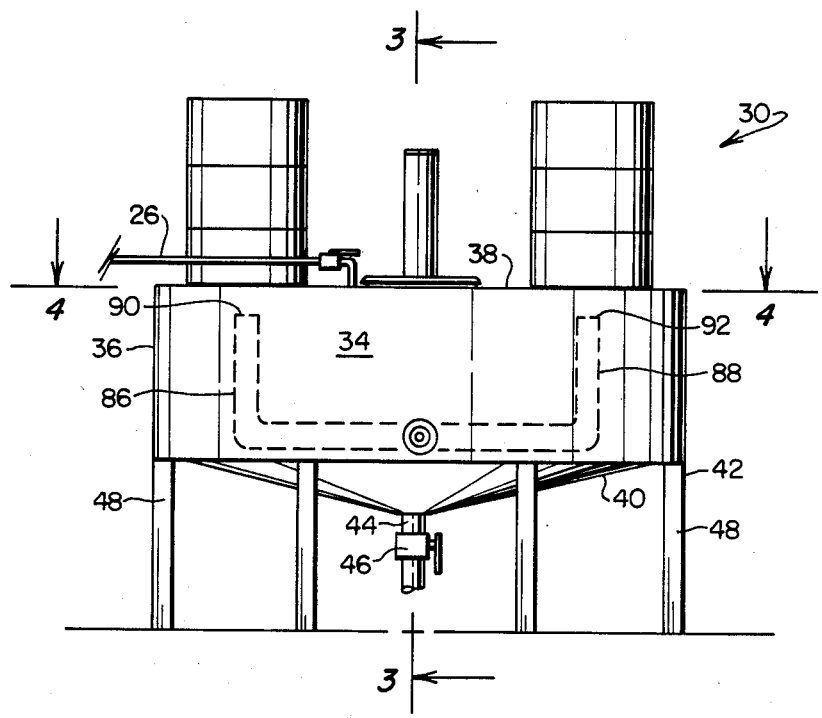
FIG. 2 is an enlarged side elevational view of the brine disposal apparatus shown in FIG. 1.

A more detailed view of brine processing apparatus 30 may be had by referring to FIGS. 2–4. Turning to FIG. 2, it may be observed that apparatus 30 includes a housing 34 having a cylindrical outer wall 36, a top surface 38, and conical bottom surface 40 which slopes downwardly from the bottom edge 42 of outer wall 36 to the center of surface 40. A fluid outlet pipe 44 is located at the center of surface 40. The flow of fluid through pipe 44 is controlled by a valve 46. Apparatus 30 is supported on stilts 48 to provide access to fluid outlet 44.

Inlet pipe 26 is connected through a flow control valve 50 to a line 52 which, in turn, is connected to the inlet end 54 of a preheater 56 as may be seen by referring to FIGS. 3 and 4. Preheater 56 preferably consists of a continuous coil of copper tubing which is centrally located within the housing 34 adjacent top surface 38 as best seen in FIG. 4. The outlet end 58 of preheater 56 is connected to a line 60 which extends radially outwardly and which, in turn, is connected to a float valve assembly 62 that is located adjacent the inner surface 64 of outer wall 36 and that sets the level of the brine in housing 34. Looking again to FIG. 3, it may be observed that housing 34 contains a main chamber 70 which is defined by top surface 38, bottom surface 40, and partially by a cylindrical inner wall 72 which is spaced inwardly of but is concentric with outer wall 36. Inner wall 72 is sealed against bottom surface 40 and the height of inner wall 72 is greater than the level of brine which is maintained within the housing 34. An insulating chamber 74 is defined between inner wall 72 and outer wall 36. Chamber 74 isolates outer wall 36 from the relatively high tempeatures reached in the main chamber 70 when the processing apparatus 30 is operated. Thus, the exterior of outer wall 36 may be touched safely when the apparatus is being operated. It should be noted that the outlet end 58 of preheater 56 is positioned in housing 34 above insulating chamber 74 such that incoming brine enter that chamber as may be seen in FIGS. 3 and 4.

Referring again to FIG. 3, it may be seen that a brine heater assembly 76 is mounted in the main chamber 70 of housing 34 adjacent the bottom surface 40. Assembly 76 includes a primary heater tube 78 which extends inwardly and a horizontal orientation through one side of outer wall 36 and through one side of inner wall 72 into main chamber 70. Heater tube 78 extends across chamber 70 and includes a T-shaped connector 80 which connects to one end of each of a pair of secondary heater tubes 82 and 84 as may be seen by referring to FIG. 4. Tubes 82 and 84 are supported in a horizontal position adjacent the bottom surface 40 of housing 34 and extend along opposite sides of primary tube 78 in the main chamber 70. The opposite ends of tubes 82 and 84 are connected to vertically extending heater exhaust pipes 86 and 88, respectively, which are shown in phantom in FIG. 2. Referring again to FIG. 3 the ends 90 and 92 of exhaust pipes 86 and 88 extend above inner wall 72 and terminate in close proximity to the top surface 38 of housing 34 radially outwardly of preheater 56. A gas burner 94 is mounted in primary heater tube 78 radially inwardly of outer wall 76. Gas burner 94 may be a typical tank burner of the kind utilized to heat crude oil that is in a storage tank to enable the oil to be pumped or transferred to another container. Gas is supplied to burner 94 through a line 96 which contains a gas shut-off valve 98. The gas which is supplied to burner 94 may be gas which is recovered from the well 10 and put into a sales line, not shown, or it may be gas which would otherwise be flared or burned off at the well site.

The oil well brine which empties into the insulating chamber 74 from preheater 56 is considerably cooler than the brine in the main chamber 70 and acts to cool outer wall 36. The brine in chamber 74 passes into main chamber 70 where it is heated by heater assembly 76 through an opening 100 in inner wall 72. The float valve assembly 62 maintains the brine in the insulating chamber 74 and the main chamber 70 at a set level such that brine covers the primary and secondary heater tubes 78, 82, and 84, respectively, but remains below the top of inner wall 72. The heater 94 in heater assembly 76 draws ambient air into heater tube 78 from outside of housing 34, and heats the air which, in turn, heats primary tube 78 and secondary tubes 82 and 84. Heat in the tubes, 78, 82, and 84 is transferred to the brine and causes water to evaporate from the brine. Hot air which is exhausted from exhaust pipes 86 and 88 of heater assembly 76 combines with the water vaporized from the brine to elevate the temperature in the main chamber 70. Warm air is exhausted from main chamber 70 through a housing exhaust stack 102 which is mounted in the center of top surface 38. A back pressure control plate 104 is placed on the outer end of stack 102 to maintain a slightly positive air pressure within housing 34.

As the warm air exhausted from the pipes 86 and 88 and the water vapor in main chamber 70 are exhausted from housing 34 through stack 102, they necessarily flow over and heat the copper preheater coil which is adjacent the housing exhaust stack 102. As the warm water vapor passes over the preheater 56, water condenses on the outside of the coil. The condensate is collected by a drip tray 110 located beneath the coil and is discharged through line 112 which passes out of housing 34 through an opening 114 in outer wall 36 to a collection container, not shown. The primary reason for collecting the condensate is to prevent it from dripping back into the main chamber and diluting the brine solution.

As the brine in main chamber 70 is heated and water is evaporated, additional brine is added to the solution at a controlled rate through float valve assembly 62 and the concentration of the brine in chamber 70 is increased at a controlled rate. Brine is heated in main chamber 70 until sufficient water has been evaporated to cause a significant quantity of the precipitable salts, such as sodium chloride and calcium chloride, to precipitate out of solution and to form a thick slurry with a concentrated brine or supernatant. The slurry is drained from main chamber 70 into containers such as 5 gallon drums, not shown, by opening valve 46 and outlet pipe 44. Any concentrated brine which also flows into the container is drained from the container and returned to main chamber 70. Although it is not necessary, it is preferable to place the precipitate in a strainer and rinse it with plain water or with incoming brine whch is substantially less concentrated than the supernatant in main chamber 70 before the precipitate is placed in the container in order to ensure that all of the concentrated brine is removed from the precipitate. Subsequent to being removed from chamber 70, the precipitate is subjected to additional heat to drive off residual water. It has been found that if the precipitate is heated slower and to a lower temperature than that of main chamber 70, the precipitate forms relatively large crystals. The large crystals are preferred because they may be crushed to provide salt crystals suitable for commercial use such as melting of ice or snow on roadways. The precipitate may be heated by placing the container on the top surface 38 of housing 34 directly above the ends 90 and 92 of the heater exhaust stacks 86 and 88 or it may be heated at a remote location such as a crushing facility. Of course, instead of draining the slurry from main chamber 70, the brine may be heated in chamber 70 until all of the water is evaporated and only a dry precipitate remains. Access to the inside of housing 34 to remove the dry precipitate may be gained through openings 114 and 116 in top surface 38 which are covered by hatches 118 and 120, respectively, Periodically, the supernatant in main chamber 70 is removed and sent to a processing facility where the dissolved minerals and heavy metals are reclaimed. It has been determined from tests that the cost of processing brine for disposal by the injection well method may be reduced by approximately 30 to 50 percent by utilizing the apparatus 30 of the present invention. Additionally, it has been found to be economically feasible to reclaim the dissolved minerals and the heavy metals in the supernatant as well as the salts.

It has been discoverd that when the brine processing apparatus is operated in cold weather, the efficiency of the unit decreases because water vapor condenses on the inner surface of outer wall 36. Consequently, it has been found that the efficiency of the brine processing apparatus 30 will be enhanced when the unit is operated in cold weather if the outer wall 36 of housing 34 is covered with or is constructed from an insulative material. With the insulative material the inner surface of outer wall 36 will remain relatively warm when the apparatus 30 is being operated and water vapor will not condense on that surface.

Housing 34 for the brine processing apparatus 30 may be constructed out of steel plate; however, the resulting structure is quite heavy and somewhat difficult for a crew (e.g. of two men) to handle. Additionally, it is desirable for the portions of the steel housing which come into contact with the brine to be coated with a corrosion and erosion resistant material such as a plastic, glass, ceramic, or rubber material or to be constructed out of Monel or Inconel alloy, or other suitable materials. It has been found preferable to construct the housing 34 out of fiberglass or other fiber-reinforced plastic material. With this insulative material the housing is light in weight, can be handled easily by two men, and is resistant to corrosion and erosion. In order to provide the fiberglass housing with sufficient rigidity to enable it to be transported and set up at well sites, it has been found to be advantageous to mount the housing on a skid or to provide a supporting frame.

From the description above it may be seen that the present invention provides a brine disposal apparatus and process for the controlled concentration of brine that is economical, that does not require transportation of the brine, that is environmentally acceptable and that allows the concomitant recovery of the valuable constituents contained in the brine. Additionally, the apparatus utilizes components which are relatively simple and which require little maintenance.

Since certain changes may be made to the above-described apparatus and method without departing from the scope of the invention herein, it is intended that all matter contained in the description thereof or shown in the accompanying drawings shall be interpreted as illustrative and not in a limiting sense.

We claim:

1. An oil well brine processing apparatus which comprises:

a housing;

a liquid brine inlet in said housing;

a main chamber in said housing for receiving brine from said inlet;

heating means in said main chamber for evaporating water from said brine to cause precipitable salts to precipitate out of solution;

level setting means for maintaining said liquid brine at a set level in said main chamber wherein said level is set to ensure that a portion of said heating means is covered by said brine and to provide an air space in said housing above said main chamber;

said level setting means including a level sensing means for sensing a present liquid level located in said main chamber and a shut off means for interrupting the flow of brine from said inlet to said main chamber wherein said shut off means is operatively connected to said level sensing means to interrupt said brine flow when said liquid level reaches said present level;

preheating means positioned in said main chamber above said brine and connected to said inlet for preheating incoming liquid brine before it enters said main chamber;

said preheating means including an outlet for discharging preheated liquid brine into said main chamber;

wherein said main chamber heating means includes means for exhausting ambient air heated by said main chamber heating means into said main chamber above said main chamber heating means but below said preheating means such that said heated ambient air contacts said water vapor from said heated brine to increase the temperature of the gasses in the main chamber applied to said preheating means;

housing exhaust means for exhausting water vapor and heated ambient air from said housing subsequent to flowing over said preheating means; and a housing outlet port for withdrawing brine and precipitates from said housing.

2. The brine processing apparatus of claim 1 further comprising collecting means for collecting water which condenses on said preheating means, wherein said collecting means is mounted in said main chamber above said brine level and said collecting means prevents said condensate from mixing with and diluting said brine in said main chamber.

3. The brine processing apparatus of claim 1 in which said housing cmprises an outer wall and an inner wall, said inner wall partially defining said main chamber and said inner wall being spaced apart from said outer wall such that an insulating chamber is formed in said housing between said main chamber and said outer wall.

4. The brine processing apparatus of claim 1 in which:

said heating means includes a metal tube, a heater inlet port at one end of said tube, a heater exhaust port at the other end of said tube and a heater mounted in said tube;

wherein the portion of said tube which contains said heater is positioned in said main chamber below said brine level;

said heater inlet ports provides a supply of ambient air from outside of said housing to said heater; and said heater exhaust port is positioned in said main chamber above said brine level.

5. The brine processing apparatus of claim 4 in which: said heater exhaust port is located on one side of said preheating means and said housing exhaust means is positioned on the other side of said preheating means such that gases from said exhaust port must flow over said preheating means to reach said housing exhaust means.

6. The brine processing apparatus of claim 4 in which:

said housing further comprises a substantially flat top surface; and said heater exhaust port is located adjacent said top surface wherein said top surface is heated by gases exhausted from said port.

7. The brine processing apparatus of claim 4 including means for providing a supply of well gas connected to said heater.

8. An integrated process for the controlled concentration of oil well brine to cause precipitable salts to precipitate out of solution which comprises the steps of:

providing a housing, a brine inlet in said housing, a main chamber in said housing for receiving brine, a heating means in said main chamber, a level means for maintaining said brine at a set level in said main chamber wherein a portion of said heating means is covered by said brine and an air space is provided in said housing above said main chamber, said level setting means including a level sensing means for sensing a preset liquid level located in said main chamber and a shut off means for interrupting the flow of brine from said inlet to said main chamber wherein said shut off means is operatively connected to said level sensing means to interrupt said brine flow when said liquid level reaches said preset level, a preheating means positioned in said housing above said brine level and connected to said brine inlet, said preheating means including an outlet for discharging preheated liquid brine into said main chamber, a housing exhaust means located above said brine level, wherein said main chamber heating means includes means for exhausting ambient air heated by said main chamber heating means into said main chamber above said main chamber heating means but below said preheating means, and an outlet port in said housing;

supplying brine to said inlet port;

preheating said brine in said preheating means;

directing liquid brine from said preheating means to said main chamber;

further heating said preheated brine by contact with said heated air in said main chamber to cause water to evaporate from said brine to obtain a slurry of precipitated salts and brine;

exhausting said evaporated water from said main chamber; and removing said slurry from said main chamber through said outlet port.

9. The method of claim 8 including the steps of:

providing collecting means for collecting water which condenses on said preheating means; and removing said water from said collecting means.

10. The method of claim 8 including the step of collecting said concentrated brine from said brine chamber periodically.

11. The method of claim 8 wherein:

said heating means is provided with a metal tube, a heater inlet for receiving ambient air at one end of said tube, a heater exhaust port at the other end of said tube, and a heater mounted in said tube;

said tube is provided with a intermediate said inlet and said exhaust port which contains said heater wherein the portion of said tube which contains said heater is positioned below said brine level;

said housing is provided with an outer wall;

said outer wall defines an opening for receipt of said metal tube;

said heater inlet port occupies the portion of the metal tube which passes through said opening in the outer wall; and said heater exhaust port is located in said main chamber and is positioned above said brine level.

12. The method of claim 11 wherein said preheating means is provided to be positioned between said heater exhaust port and said housing exhaust port.

13. The method of claim 11 wherein:

said housing is provided with a top surface which is substantially flat; and said heater exhaust port is provided to be positioned adjacent said top surface.

14. An oil well brine processing apparatus which comprises:

a housing;

a liquid brine inlet in said housing;

a main chamber in said housing for receiving brine from said inlet;

heating means in said main chamber for evaporating water from said brine to cause precipitable salts to precipitate out of solution;

level setting means for maintaining said liquid brine at a set level in said main chamber wherein said level is set to ensure that a portion of said heating means is covered by said brine and to provide an air space in said housing above said main chamber;

said level setting means including a level sensing means for sensing a preset liquid level located in said main chamber and a shut off means for interrupting the flow of brine from said inlet to said main chamber wherein said shut off means is operatively connected to said level sensing means to interrupt said brine flow when said liquid level reaches said preset level;

preheating means positioned in said main chamber above said brine and connected to said inlet for preheating incoming liquid brine before it enters said main chamber;

said preheating means including an outlet for discharging preheated liquid brine into said main chamber;

wherein said main chamber heating means includes means for exhausting ambient air heated by said main chamber heating means into said main chamber above said brine level but below said preheating means such that said heated ambient air combines with water vapor from said heated brine to increase the temperature of the gasses in the main chamber applied to said preheating means;

housing exhaust means for exhausting water vapor from said housing;

a housing outlet port for withdrawing brine and precipitates from said housing;

said housing comprising an outer wall and an inner wall, said inner wall partially defining said main chamber and said inner wall being spaced apart from said outer wall such that an insulating chamber is formed in said housing between said main chamber and said outer wall; and said preheating means includes a brine outlet, wherein said brine outlet directs brine from said preheating means into said insulating chamber to further preheat said incoming brine and to cool said outer wall; and a fluid conduit means is provided in said inner wall beneath said set level for connecting said insulating chamber with said main chamber to enable brine to flow from said insulating chamber to said main chamber.

15. An integrated process for the controlled concentration of oil well brine to cause precipitable salts to precipitate out of solution which comprises the steps of:

providing a housing, a brine inlet in said housing, a main chamber in said housing for receiving brine, a heating means in said main chamber, a level means for maintaining said brine at a set level in said main chamber wherein a portion of said heating means is covered by said brine and an air space is provided in said housing above said main chamber, said level setting means including a level sensing means for sensing a preset liquid level located in said main chamber and a shut off means for interrupting the flow of brine from said inlet to said main chamber wherein said shut off means is operatively connected to said level sensing means to interrupt said brine flow when said liquid level reaches said preset level, a preheating means positioned in said housing above said brine level and connected to said brine inlet, said preheating means including an outlet for discharging preheated liquid brine into said main chamber, a housing exhaust means located above said brine level, wherein said main chamber heating means includes means for exhausting ambient air heated by said main chamber heating means into said main chamber above said brine level but below said preheating means, and an outlet port in said housing;

supplying brine to said inlet port;

preheating said brine in said preheating means;

directing liquid brine from said preheating means to said main chamber;

further heating said preheated brine in said main chamber to cause water to evaporate from said brine to obtain a slurry of precipitated salts and brine;

exhausting said evaporated water from said main chamber;

removing said slurry from said main chamber through said outlet port;

providing said housing with an outer wall and an inner wall that partially defines said main chamber wherein an insulating chamber is formed between said main chamber and said outer wall;

providing a fluid conduit means for connecting said insulating chamber with said main chamber; and directing preheated brine into said insulating chamber to further preheat said brine and to cool said outer wall.

* * * * *